United States Patent Office 3,432,856
Patented Mar. 11, 1969

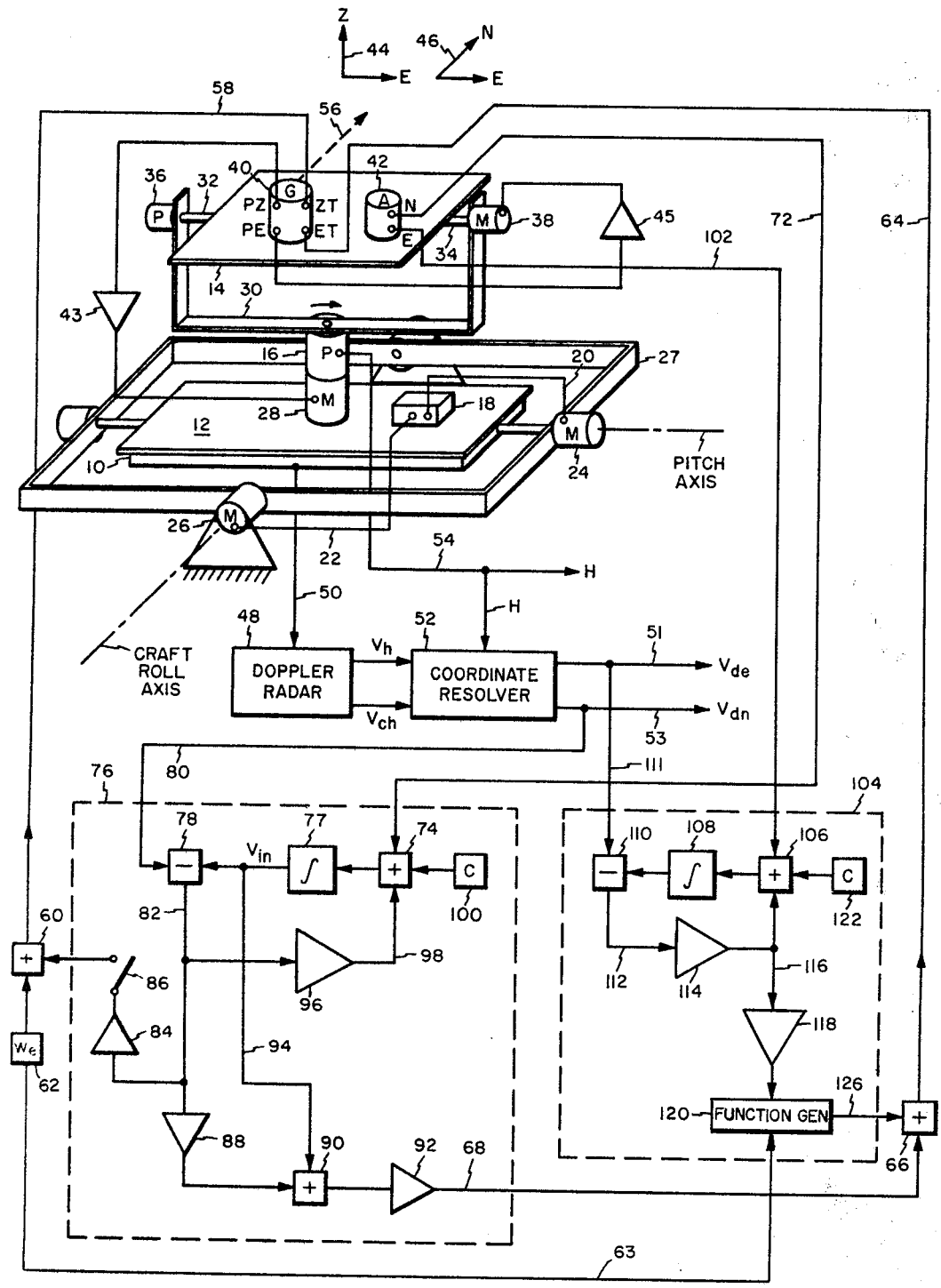

---

3,432,856
DOPPLER INERTIAL NAVIGATION SYSTEM
Heinz Buell, Mount Kisco, N.Y., Joseph A. Gannon, Wayne, Pa., and Jack Rubin, Brooklyn, N.Y., assignors to Singer-General Precision, Inc., a corporation of Delaware
Filed July 17, 1967, Ser. No. 653,974
U.S. Cl. 343—9                             17 Claims
Int. Cl. G01s 9/44; G06f 15/50; G06g 7/78

ABSTRACT OF THE DISCLOSURE

An inertial reference table 14 is mounted upon a two-gimbal mounting structure including gimbal ring 30. It is arranged for leveling about an East axis on gimbal shafts 32–34, and arranged for rotation for azimuth alignment upon a vertical gimbal shaft at motor 28. The system is arranged for in-flight gyrocompassing in response to North axis signals from accelerometer 42 supplied to gyrocompassing circuit 76. Electrical compensation for leveling errors about the North axis is provided in response to East axis outputs of the accelerometer 42 by the compensating circuit 104. Both the gyrocompassing circuit 76 and the compensating circuit 104 are corrected and damped by vectorial velocity signals derived from a Doppler radar set 48.

---

Brief description of the invention

This invention relates to navigation systems which are particularly useful for producing navigation and attitude information for aircraft, and which employ a combination of Doppler radar and inertial elements in a new and more efficient combination. In particular, it includes radar equipment which is capable of measuring velocity of the craft.

Description of the prior art

Various navigation data systems have been proposed previously which employ combinations of inertial elements and Doppler radar sets for measuring craft velocities and direction. For instance, systems of this type are disclosed in prior U.S. patents as follows: 2,914,763—Greenwood et al., issued Nov. 24, 1959; and 3,028,592—Parr et al., issued Apr. 3, 1962, each entitled, "Doppler Inertial Navigation Data System." Attention is also directed to the book Inertial Navigation by Richard H. Parvin, published by D. Van Nostrand Company, of Princeton, N.J., in 1962. The use of a Doppler radar in combination with inertial navigation components is particularly mentioned in connection with FIGS. 11–13 of that text.

Doppler radar systems are usually arranged to transmit two or more beams of radiant energy from the vehicle at different angles and to receive a portion of the energy after reflection from the earth. Motion of the vehicle relative to the earth causes the frequency of the received energy to deviate from that of the transmitted energy, and by measuring and comparing the frequency shifts of the various beams, the ground speed and the drift angle (the angle between the horizontal projections of the velocity vector and the longitudinal axis) of the vehicle can be determined. The nature of the reflection process causes the frequency of the returned signal to fluctuate rapidly and erratically thus leading to large errors in the instantaneous indications of ground speed and drift angle. However, Doppler systems are capable of very high accuracy if the data be averaged over a period of, say, several minutes, and the accuracy does not deteriorate with the passage of time.

Inertial systems may comprise a gyroscopically stabilized horizontal platform on which are mounted two accelerometers so that they measure accelerations in orthogonal directions in the plane of the platform. The accelerations so measured can be integrated to obtain velocities which can in turn be resolved to determine ground speed and drift angle. The accuracy of such systems depends, among other things, upon the horizontality of the platform since the accelerometers cannot distinguish between accelerations caused by motion of the vehicle relative to the earth and the acceleration due to gravity. Even if the platform originally were erected to exact horizontality it would deviate therefrom after a time because of the inherent random drift of the gyroscopes used for stabilization. Inertial systems as above described are thus seen to have the disadvantage that their accuracy deteriorates rapidly with the passage of time although the instantaneous, or short time, accuracy is excellent.

Doppler and inertial systems are thus seen to have complementary advantages, that is, the former has excellent long term accuracy while the latter has excellent short term accuracy. Stated another way, Doppler systems have good response to low frequency fluctuations of input data while inertial systems have good response to high frequency fluctuations of input data. One factor affecting the accuracy of both systems is the need for accurate knowledge of the vertical direction. This knowledge is required in Doppler systems in order to determine the angular position of the transmitted beams, although recent developments in the art of linear array antennas have relaxed the requirements somewhat. In the case of inertial systems there is a stringent requirement for knowledge of the vertical because the platform must be exactly horizontal if the accelerometers are not to interpret the acceleration of gravity as a horizontal acceleration.

It has been proposed in the past to combine Doppler and inertial components and it has been found that a composite system not only utilizes fully the advantages of each system but in addition yields greater accuracy in the crossover region than can be obtained with either system alone.

In the design of equipment for use with aircraft, weight, bulk, cost, and complexity are all extremely important considerations. In the present invention, there are the separate objects of minimization of each of the following: weight, bulk, cost, and complexity, all without serious sacrifice in the accuracy and utility of the system.

In accordance with the present invention, it has been found to be possible to reduce the complexity and the consequent weight and cost of a Doppler-inertial navigation system by employing a two-gimbal inertial reference table rather than the usual three-gimbal mounting without any sacrifice in accuracy.

In accordance with another important aspect of the improved system of the present invention, a stabilized (continuously leveled) Doppler radar antenna is employed, and the stabilized mounting for the antenna is combined with the support for the gimbal mountings for the inertial reference table.

The invention is particularly characterized by lower total weight, and greater ease of installation within the aircraft, particularly with respect to physical alignment.

Further objects, advantages and features of the invention will be apparent from the following description and the accompanying drawings.

Summary of the invention

In carrying out the invention in a preferred form thereof, there is provided a Doppler-inertial navigation data system operable for in-flight gyrocompassing and including an inertial table for support of the inertial components. A detector is provided for detecting deviations of the table from a level orientation about a North axis, and a circuit is provided and connected for operation in response to the detector for generating electrical signals to compensate the operation of the system for the deviations from level.

*Brief description of the drawing*

The sole figure is a schematic diagram of a preferred embodiment of a system in accordance with the present invention.

*Description of the preferred embodiment*

Referring more particularly to the drawing, there is shown a Doppler inertial navigation data system including a Doppler radar antenna 10 mounted upon a horizontally stabilized platform 12. A reference table 14 for the inertial guidance elements of the system is mounted by means of a two gimbal arrangement upon the antenna platform 12. The system, including the inertial elements mounted upon the inertial reference table 14, is effective to cause the table 14 to be continuously gyrocompassed in azimuth to maintain an alignment towards North, while the antenna platform 12 remains aligned with the axis of the aircraft. A pickup transducer 16 continuously measures the angle between platform 12 and table 14. The resultant signal is an accurate measurement of the heading of the aircraft in relaton to North. While the system also provides complete velocity data (as will be more fully described below) the accurate heading signal provided by device 16 is regarded as one of the most vital and important outputs of the system.

The antenna platform 12 is maintained in a horizontally stabilized position by means of vertical reference signals which may be obtained from a level detector device 18 of conventional construction. These leveling signals are available through connections 20 and 22 to leveling servomotors 24 and 26. However, it is one of the features of this invention that the antenna platform need not be stabilized in the level position with extreme accuracy, and accordingly, vertical reference signals from another source remote from the platform 12 are adequate for this leveling operation.

Servomotors 24 and 26 form parts of a two-gimbal mounting for platform 12, which includes a gimbal ring 27. The shafts of motors 24 and 26 are respectively parallel to the pitch and roll axes of the craft. For practical purposes, they may be considered as coincident with the pitch and roll axes of the craft.

The mounting for the reference table 14 upon the antenna platform 12 includes an azimuth positioning motor 28, and the pickup device 16, the stators of which are fastened together and mounted upon the antenna platform 12. The rotors of these elements are fastened together to a shaft which supports a gimbal ring 30. For additional stability, the gimbal ring 30 also has a pivotal connection at its upper end which is fixed with relation to the antenna platform 12. However, this upper end pivot connection and the upper portion of the gimbal ring 30 are omitted from the drawing for purposes of clarity. The motor 28 is normally caused to rotate the gimbal ring 30 in azimuth so as to maintain the position of the gimbal ring 30 in a plane generally perpendicular to the North direction.

Pivotally mounted upon the gimbal ring 30 there are co-axial shafts 32 and 34 which directly support the reference table 14. The shaft 32 may form the rotor shaft of a synchro-pickup device 36, the stator of which is rigidly mounted to the gimbal ring 30. The shaft 34 is the rotor shaft of a motor 38, the stator of which is rigidly connected to the gimbal ring 30. The mutual axis of shafts 32 and 34 is generally maintained in an East-West alignment (hereinafter referred to simply as the East axis), and the motor 38 is usually energized as needed to rotate the shaft 34 and the reference table 14 to maintain the table 14 horizontal with respect to the East axis, even though the antenna platform 12 may not be maintained perfectly horizontal.

Since no third gimbal is provided for the reference table 14, no final correction of the level of the reference table 14 for deviations about the North axis is available. In accordance with the present invention the need for physical North axis corrections is avoided by detecting the magnitude of the North axis leveling error and introducing electrical corrections for this error in lieu of physically correcting the position of the reference table 14. This simplification of the system does not interfere with the accuracy attainable by the navigation data system, and the system is capable of accurate "in-flight" gyrocompassing despite the simplification of the system described here.

The inertial sensing devices attached to and supported upon the reference table 14 include a two-axis, two degree of freedom, gyroscope 40, and a two-axis accelerometer 42. The gyroscope 40 is responsive to rotational displacements about a vertical axis (sometimes also referred to herein as the azimuth or "Z" axis) and to rotational displacements about an East axis, as indicated symbolically by the vectors at 44. The accelerometer 42 is responsive to accelerations along the North axis, and to accelerations along the East axis, as symbolically illustrated by the vectors at 46. It will be understood that two gyros, each having a single degree of freedom, may be substituted for the single two degree of freedom gyro 40, and two single-axis accelerometers may be substituted for the accelerometer 42.

The accelerometer 42 provides signals at output connections for North accelerations and East accelerations respectively indicated in the drawing as "N" and "E." The use of these accelerometer signals in the system will be described more fully below. Similarly, the gyroscope 40 provides pickup output signals for rotational displacement errors about the azimuth axis and about the East axis respectively indicated at "PZ" and "PE." Torquing input signals are applied to the gyro 40 for azimuth axis and Easterly axis rotations at the respective input terminals "ZT" and "ET." The azimuth output signal is applied through an amplifier 43 to control the table azimuth positioning motor 28. The East axis gyroscope output signal is applied through an amplifier 45 to control the table East axis positioning motor 38.

The Doppler radar portion of the system is indicated schematically by the box at 48 connected at 50 to the antenna 10. This radar set may correspond to radar sets which have been used in prior systems. It may, for instance, employ three or more radar beams, with two beams aimed downwardly ahead of the aircraft on each side of it, and with one or two beams directed downwardly to the rear of the aircraft, on one or both sides. Comparison of the frequencies of the transmitted signals and the echo signals reflected back from the ground for the various beams provides an accurate indication of aircraft velocity and direction, particularly when averaged out over a period of time to compensate for irregularities in the terrain. For a more complete description of a radar set which is satisfactory for use in the present invention, reference is made to the disclosure contained in U.S. Patent 3,028,592, Parr et al., previously referred to above. The Doppler radar set 48 is capable of providing output signals which are an accurate indication of the velocity $V_h$ of the aircraft along the aircraft heading direction, and of the velocity $V_{ch}$ indicative of the component of aircraft velocity in the cross heading direction (perpendicular to the direction of aircraft heading). The radar system is also capable of providing other important information, such as vertical velocity of the aircraft, which is not necessarily pertinent to the description of the present invention, and which conesquently is not dealt with here.

The heading and cross heading signals from the Doppler radar 48 are connected to a coordinate resolver apparatus 52 which is operable to convert the heading and cross heading velocity information into North and East velocity information $V_{dn}$ and $V_{de}$ (Doppler-North, and Doppler-East velocities). In order to accomplish this purpose, the coordinate resolver 52 must also be provided with an accurate heading H signal indicated at 54, from the heading synchro 16. It will be recalled that this heading signal gives an indication of the angle between the aircraft heading and true North. The function of the coordinate resolver 52 may be carried out by a digital computer, and the digital computer may be one which is also used for other purposes in the aircraft. The Doppler radar system sometimes may be referred to hereinafter as including the coordinate resolver 52.

The method of determining compass directions by gyrocompassing consists basically in sensing the earth's rotation about its North-South axis to thereby determine the direction of North (or South). Gyrocompassing is most easily performed from a position which is stationary with respect to the earth. However, accurate "in-flight" gyrocompassing may be accomplished with apparatus in accordance with the present invention.

The gyro 40 is oriented with its spin axis 56 pointed towards North, after the system has reached equilibrium. Because a gyro inherently maintains its attitude stabilized absolutely in space, in order to maintain the spin axis 56 of the gyro 40 pointing in a Northerly direction, the gyro must be "torqued" by an input signal on the azimuth axis to compensate for the continuous rotation of the earth, and to compensate for any East component of vehicle velocity, each of which tends to require that the spin axis of the gyro be turned in absolute orientation in order to continue to point North. These torquing correction signals about the azimuth axis are supplied through the torquing input connection "ZT" of the gyro 40 from a conductor 58. These signals are supplied from a suitable correction circuit 62 through an adding circuit 60. Similarly, the gyro 40 must be continuously torqued about its East axis by a function which is proportional to the North velocity of the craft in order to compensate for the North-South curvature of the earth to keep the table 14 horizontal about the East axis. This correction is applied to the East torquing input "ET" of gyro 40 through a conductor 64, adding circuit 66, and conductor 68, from a gyrocompassing circuit 76. As previously mentioned, the table 14 is positioned about the azimuth and East axes in response to output signals at PZ and PE from the gyro 40 by means of the amplifiers 43 and 45 and positioning motors 28 and 38.

As long as the table 14 and the gyro 40 are aligned with the gyro axis 56 at true North, the East axis will be aligned to true East and the East input axis is therefore insensitive to East component velocities. Therefore, the regular North velocity compensation provided by circuit 76 is quite adequate for maintaining the table 14 level about the East axis without any requirement for correction on account of Easterly velocities due either to the rotation of the earth or to Easterly velocity of the vehicle with relation to the surface of the earth. However, if the table 14 is not perfectly aligned with axis 56 to the North, then the East axis will be out of alignment also, with the result that true East velocities appear to have a North-South component which is coupled into the disoriented East input axis of the gyro 40. This will include an apparent North component velocity due to the eastward rotation of the earth. None of these "apparent" North velocity components are compensated for by the regular North velocity compensation signals of circuit 76. The result is that the table 14 is no longer perfectly stabilized to a horizontal position about the East axis by the torquing signals applied through connection 64 to the ET terminal of gyro 40. Therefore, the continuance of an error in azimuth alignment of table 14 will cause an accumulation of error in leveling of the table 14 about the East axis. The deviation of the table from the horizontal position about the East axis results in a gravity signal on the North axis of the accelerometer 42.

The North axis accelerometer signal appears on the "N" terminal of the accelerometer and is supplied through connection 72 to an adding circuit 74 within the gyrocompassing circuit 76. The North axis accelerometer signal consists of a combination of an acceleration signal due to any acceleration in the Northerly direction plus the North axis gravity signal due to any tilting of the table 14 about the East axis. The accelerometer signal received by adding circuit 74 is directed to an integrating circuit 77 to provide a signal equivalent to velocity. This may be referred to as in inertially determined North velocity $V_{in}$. The output $V_{in}$ from the integrator 77 is connected to a comparison circuit 78. Through connection 80, the North Doppler velocity $V_{dn}$ is also provided to comparison circuit 78. By means of comparison circuit 78, the true North velocity was determined by the Doppler radar is subtracted from the combination of North velocity and integrated accelerometer gravity signal derived from the accelerometer 42 through the integrator 76. The difference which appears at the comparison circuit output connection 82 represents the integrated gravity signal only, and this is a measure of the tilt of the table 14 about the East axis. This error is amplified in an amplifier 84, and is supplied through a switch 86 (when the switch is closed) and the adding circuit 60 to torque the gyro about the azimuth axis to thereby re-align table 14 to re-aim the spin axis 56 of the gyro 40 to true North. The error signal at 82 is also supplied through a path including an amplifier 88, an adding box 90, and an amplifier 92 to the East torquing circuit including connection 68, adding box 66 to the conductor 64. Thus, the error signal is caused to torque the gyro 40 about the East axis to re-establish the horizontal position of the table 14.

The so-called "regular" North velocity compensation from circuit 76 is proportional to North velocity expressed in terms of radians of rotation about the earth. This signal is supplied through the adding circuit 90 and the amplifier 92 by means of a connection 94 which carries the inertially determined North velocity signal $V_{in}$ to the adding circuit 90.

The error signal at connection 82 is also supplied through an amplifier 96 in a stabilizing feedback connection at 98 to the adding circuit 74 so as to maintain stable operation of the circuit. As is well known in the art of inertial guidance systems, the outputs of accelerometers must be corrected for "Coriolis" errors whenever they are operated in an earth-fixed coordinate system. An appropriate "Coriolis" correction is applied in the gyrocompassing circuit 76 by means of a Coriolis circuit schematically indicated at 100 feeding into the adding box 66.

When starting up the system, and commencing the gyrocompassing operation, the switch 86 in the azimuth correction circuit may be left open so that fast initial leveling about the East axis may be achieved. The switch 86 may then be closed and kept closed for the remainder of the operation of the system in order to provide automatic gyrocompassing as described above. The closure of switch 86 may be accomplished by an automatic time delay means (not shown).

The above description of the system assumes that the table 14 has been perfectly stabilized in a horizontal position with respect to the North axis. However, this condition does not exist because of the fact that the table 14 is mounted upon a two gimbal system which does not have a gimbal pivoted about the North axis. Accordingly, tilting of table 14 about the North axis is detected by the East accelerometer output, and the system is electrically compensated for such displacement. For this purpose, the East accelerometer output on terminal "E" of accelerometer 42 is supplied through a connection 102 to a North axis tilt compensating circuit 104. This circuit derives an electrical tilt correction signal which is supplied through the output connection 126, and through the adding circuit 74 to approximately modify the East torquing signal supplied to the gyro through connection 64.

Within the circuit 104, the East accelerometer signal from connection 102 is applied through an adding circuit 106 to an integrator 108 and thus to a comparison circuit 110. The East accelerometer output includes a combination of signals due to actual East axis accelerations of the craft plus a gravity term due to tilt of the table 14 about the North axis. The comparison circuit 110 is connected to receive the Doppler East velocity signal $V_{de}$ from the resolver 52, and is operable to subtract the Doppler East velocity signal from the integrated signal received from the integrator 108. The difference signal at the output 112 of comparison circuit 110 represents the portion of the output of integrator 108 which is due to a gravity signal component from the East accelerometer. This error signal is modified in the amplifier 114 and is fed back at connection 116 to the input adding circuit 106 for the purpose of stabilizing the system. The signal at 116 is also passed through appropriate amplifiers 118 and 120 which convert the error signal to terms appropriately representative of the required tilt correction function at connection 126. The East accelerometer output is corrected for Coriolis by means of an appropriate circuit schematically indicated at 122 feeding into the adding box 106.

The cause of the error in the East torquing signal resulting from tilt of the table 14 away from the horizontal about the North axis is as follows:

Under such conditions, the East axis of the gyro 40 is tilted away from the horizontal. Accordingly, it may be said to have a vectorial component of input about the vertical or azimuth axis. With respect to this vertical component of its input, it requires an earth rate correction similar to the correction applied to the azimuth gyro input from the circuit 62 as previously described above. However, this is only a fractional correction proportional to the trigonometric "sine" function of the angle of displacement from the horizontal. This correction factor is generated within the circuit 120 and may be expressed as follows:

$$(W_e \sin L + V_e/R \tan L) \sin U_n$$

where:
$W_e$ = earth's rate of rotation
L = latitude
$V_e$ = East velocity of the craft
R = radius of the earth
$U_n$ = the angle of (tilt) about North axis The portion of the above expression within the parentheses represents the earth rate correction applied by circuit 62 to the azimuth torquing input of gyro 40. The circuit 120 may conveniently obtain this function from circuit 62 through interconnection 63 as shown in the drawing.

The tilt correction factor from circuit 120 may be considered as only a first order correction. However, this correction is quite adequate in the preferred form of the invention in which the two gimbal supporting structure for table 14 is itself supported upon the antenna platform 12. This is because the antenna platform itself is stabilized at a reasonably level position by a coarse leveling system. The form of the system which is disclosed in the specification and in the drawing including the feature of mounting table 14 upon the platform 12 is the preferred form. However, it is within the scope of the present invention to employ a two gimbal mounting for the inertial system reference table 14 in which the mounting is not necessarily supported upon a horizontally stabilized system. In such a situation, the correction signals derived from the circuit 104 to compensate for rotational displacements away from the horizontal about the North axis 46 may be anticipated to be greater. Furthermore, if a high degree of system accuracy is required, more elaborate correction signals of higher order may be necessary to compensate for such deviations from level.

The employment of only a two gimbal mounting for the inertial reference table 14 results in a substantial saving in the cost, the weight, and the complexity of the apparatus, even though it is necessary to provide for electrical compensation for tilt about the North axis.

In the preferred form of the invention in which the gimbal mountings and the table 14 are supported upon the platform 12, substantial additional advantages are obtained. For instance, installation in the aircraft is considerably simplified because of the fact that separate mountings and installations for the antenna platform 12 and the inertial table 14 are not required. Furthermore, because of the unitization of the aircraft mountings for these elements, there is no requirement for accurate azimuth alignment between these two components at the time they are mounted in the aircraft. Furthermore, there is less exposure to later problems of misalignment of these elements because of possible flexure of the air frame of the aircraft, or because of mechanical shocks, or from other causes.

The support of the inertial table gimbals upon the antenna platform also provides the further substantial advantage that the table 14 is thereby given a horizontally stabilized support (when the antenna is stabilized). Thus, with only a two gimbal mounting, the table is nevertheless maintained substantially horizontal about the North axis, and a simple first order electrical correction for North axis level deviations is quite adequate to provide a very accurate navigation data system.

It is apparent that the system may be operated in a ground alignment mode in order to provde a gyrocompassing operation before the aircraft leaves the ground, for instance, while its engines are warming up and during the check-out procedures. In this mode of operation, it can be recognized that the Doppler velocity signals are zero, arbitrary zero velocity signals preferably being provided.

In another alternate mode of operation, in case the Doppler radar system 48 becomes inoperative, the system can be made to continue to operate for gyrocompassing, either without the damping of the Doppler velocity signals or on the basis of the last previous Doppler velocity signals as remembered by the system. For this purpose, Doppler velocity memory circuits of conventional construction are preferably incorporated in the Doppler velocity signal channels.

The Doppler radar unit 48 is operable to generate instantaneous velocity signals which fluctuate rather rapidly because of the influence of irregularities in the terrain over which the aircraft passes and from which the reflected radar signals are received. While the instantaneous velocity signals may not be particularly accurate, the averaged value of these signals is quite accurate. However, if an averaging or filtering circuit which is highly effective is used, then circuit complexity is increased and the speed of response of the Doppler system output signals to actual changes in coordinate velocities is somewhat reduced.

It is one of the features of the present invention that the Doppler velocity signals are not "averaged" or smoothed appreciably, thus preserving the high speed of response to actual changes in vehicle velocity. Instead of smoothing or averaging the Doppler velocity signals, the instantaneous values are used to compare directly with corresponding inertially derived velocities and to thus provide correction and damping signals for such inertially derived velocities. Since these correction signals are applied only through a reduction scaling damping circuit, the instantaneous fluctuations of the correction and damping signal do not cause appreciable fluctuation in the resultant corrected inertially derived velocity signal. The result of the corrections applied through the damping circuit is cumulative and effectively accomplishes an averaging effect, while avoiding the cost, complexity, and reduction in response which would result from averaging of the Doppler signals prior to comparison with the corresponding inertially derived velocities.

The circuits shown are preferably supplemented by means for the correction of errors such as gyro drift which are commonly present with inertial systems. It will be understood that this and other conventional refinements are preferably incorporated in the systems in accordance with the present invention.

While this invention has been shown and described in connection with a single preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

What is claimed is:

1. A navigation data system operable for in-flight gyrocompassing comprising,
    an inertial platform,
    a two axis gimbal for rotatably supporting said platform about an azimuth axis and an East axis, respectively,
    gyroscopic means normally having a reference axis in alignment relative to a North axis and being responsive to deviation of said platform about said azimuth axis and said East axis for continously restabilizing said platform,
    inertial means comprising an East axis accelerometer for detecting deviations of said platform about said North axis,
    circuit means including a Doppler radar East velocity measurement means connected for operation in response to said inertial means for generating gyroscopic correction signals to compensate the operation of said system for said deviations about said North axis, and
    said circuit means further including means operable to integrate the signal derived from said East axis accelerometer and means for comparing the integrated signal with the signal derived from said Doppler East velocity measurement means to isolate a gravity term indicating said platform's deviation about said North axis.

2. A system in accordance with claim 1 wherein there is included a Doppler antenna platform, and in which the two-axis gimbal is supported upon said antenna platform.

3. A system in accordance with claim 2 wherein said antenna platform is stabilized in pitch and roll.

4. A system for providing navigation data for a craft comprising,
    a table,
    a gimbal for supporting said table, said gimbal having two degress of freedom about an azimuth axis and an East axis respectively,
    gyroscopic means mounted upon said table and connected to control the altitude of said table about the azimuth and East axes,
    inertial means mounted upon said table for generating a signal in response to accelerations along a North axis,
    a Doppler radar means operable for determining North velocity of the craft in terms of a Doppler North velocity signal,
    a gyrocompassing circuit connected to receive said North axis acceleration signal and said Doppler North velocity signal and being operable for the in-flight gyrocompassing orientation of said platform in the North direction by supplying gyrocompassing correction signals for torquing said gyroscopic means to establish level alignment of said table about the East axis and North alignment of said table in azimuth,
    inertial means mounted upon said table for generating an East axis acceleration signal,
    a North axis level compensating circuit connected and arranged to receive and integrate said East axis acceleration signal,
    said Doppler radar means being operable for generating a Doppler East velocity signal,
    said level compensating circuit including means for receiving and comparing the Doppler East velocity signal with the integrated East acceleration signal to derive an error signal to correct for gyroscope East axis earth rate functions which exist in the presence of tilting of said platform about said North axis.

5. A system for providing navigaiton data for a craft comprising
    a gimbal mounted table having two degrees of motion,
    gyroscopic means mounted upon said table and arranged for response to rotational movement about an East axis,
    gyroscopic means mounted upon said table and arranged for response to rotational movement about an azimuth axis,
    servomotor means for the gimbal mountings of said table connected to receive output signals from said East and azimuth axis gyroscopic means and operable for changing the attitude of said table about said East and azimuth axes in response to said signals,
    means mounted upon said table for generating a signal in response to accelerations along a North axis,
    a Doppler radar means operable for determining North velocity of the craft in terms of a Doppler North velocity signal,
    a gyrocompassing circuit operable for in-flight gyrocompassing orientation of said platform in the direction of one of the earth's poles, said gyrocompassing circuit being operable to receive and integrate said North axis acceleration signal and being operable to receive and compare said Doppler North velocity signal with the integrated North axis acceleration signal to derive gyrocompassing correction signals for torquing the azimuth axis gyroscopic means and the East axis gyroscopic means to thereby correct the North alignment and the level of said table about the East axis;
    means mounted upon said table and arranged for generating a signal in response to accelerations along an East axis,
    a North axis level compensating circuit connected and arranged to receive and integrate said East axis acceleration signal,
    said Doppler radar means being operable for determining East velocity of the craft in terms of a Doppler East velocity signal,
    said level compensating circuit including means for receiving and comparing the Doppler East velocity signal with the integrated East acceleration signal to derive an error signal indicative of the deviation of said platform from a level position with respect to the North axis, and
    said compensating circuit including means for generating from said error signal correction functions to be added to the torquing signal for said East axis gyroscopic means to thereby correct said East axis gyroscopic means for earth rate functions which exist in the presence of tilting of said platform away from the horizontal about said North axis.

6. A system in accordance with claim 5 wherein
    said gyroscopic means sensitive to rotation about the East axis and said gyroscopic means sensitive to rotation about the azimuth axis are combined in a single two degree of freedom gyro.

7. A system in accordance with claim 5 wherein said means responsive to accelerations on the North axis and said means responsive to accelerations on the East axis are combined in a single two axis accelerometer device.

8. A system in accordance with claim 5 wherein the gimbal mountings for said table include only two gimbals respectively arranged to be pivoted on the East and azimuth axes.

9. A combined Doppler radar and inertial navigation data system for operation within a moving craft comprising a platform and a Doppler radar mounted thereon, a gimbal mounted inertial reference table, said gimbal being mounted upon said platform, said platform being stabilized in a substantially horizontal position with respect to the earth, gyroscopic and acceleration responsive means mounted for support upon said reference table, and a gyrocompassing circuit connected to compare signals from said Doppler radar and from said gyroscopic and acceleration responsive means to achieve an azimuth orientation of said table with respect to North.

10. A system in accordance with claim 9 wherein said radar antenna platform is stabilized in pitch and roll.

11. A system in accordance with claim 10 wherein said inertial table mountings include a vertical gimbal with a pickup device to indicate the craft heading angle.

12. A system in accordance with claim 11 wherein said gimbal mountings for said inertial reference table include only a vertical gimbal and a horizontal gimbal arranged for alignment on an East axis, the system including means for electrical compensation for tilt of said table about a North horizontal axis.

13. Vehicle navigational apparatus comprising, inertial means for deriving signals indicative of the vehicle's velocity components along directions defined by a first set of two mutually perpendicular axes, said inertial means further including means for providing signals for stabilizing a platform about a second set of two mutually perpendicular axes, said first and second sets being related by at least one common axis, separate velocity measuring means for independently deriving signals representing the vehicle's velocity components along the directions defined by the respective axes in said first set, first comparator means responsive to the velocity signal derived by said inertial means representing the vehicle's velocity along a direction corresponding to the non-common axis in said first set and to the velocity signal derived by said separate independent means corresponding to said non-common axis for deriving a first error signal indicative of the discrepancy therebetween, first feedback means coupling said error signal to said inertial means for correcting the platform stabilization signal related to the non-common axis in said second set, second comparator means responsive to the velocity signal derived by said inertial means representing the vehicle's velocity along a direction corresponding to the common axis in said first set and to the velocity signal derived by said separate independent means corresponding to this common axis for deriving a second error signal indicating the discrepancy therebetween, and means for adding said first and second error signals and for feeding back said resulting sum error signal to said inertial means for correcting the platform stabilization signal related to said common axis.

14. The apparatus in accordance with claim 13 wherein said inertial means comprises, single-axis gimbal means supported for rotation in the azimuth plane, a normally horizontal platform mounted on said gimbal for rotation about said axis, gyroscope means for measuring deviations about an axis normal to said azimuth plane and about an axis aligned to true East, and accelerometer means for measuring accelerations along axes pointed toward true East and true North respectively, the axis of said gimbal being normally aligned in a plane perpendicular to true North.

15. Apparatus in accordance with claim 14 wherein said separate independent speed measuring means comprises, a Doppler radar including antenna means having support means stabilized in pitch and roll, said gimbal means being mounted for rotation on said antenna support means.

16. The apparatus in accordance with claim 13 wherein said first and second comparator means include means for continuously supplying Coriolis, earth rate rotation and earth curvature corrections to said first and second error signals respectively.

17. Apparatus in accordance with claim 13 wherein motor drive means are provided for rotating said platform and said gimbal, respectively, said motor drive means being responsive to said stabilization signals, respectively, said stabilization signals being derived from said gyroscope means and being corrected by said first, and said first and second sum error signals respectively.

References Cited

UNITED STATES PATENTS

| | | | |
|---|---|---|---|
| 2,908,902 | 10/1959 | Gray et al. | 343—9 X |
| 2,914,763 | 11/1959 | Greenwood et al. | 343—9 |
| 3,028,592 | 4/1962 | Parr et al. | 343—8 |
| 3,131,390 | 4/1964 | Condie et al. | 343—8 |
| 3,140,482 | 7/1964 | Duncan et al. | 343—8 X |
| 3,167,763 | 1/1965 | Barkalow et al. | 343—9 |
| 3,279,086 | 10/1966 | Schlitt et al. | 33—226 |

RODNEY D. BENNETT, JR., *Primary Examiner.*

CHARLES L. WHITHAM, *Assistant Examiner.*

U.S. Cl. X.R.

235—150.25